May 23, 1939.  W. J. BROPHY  2,159,128
MOISTENER FOR CIGAR SHAPERS
Filed March 18, 1937

INVENTOR
William J. Brophy
BY
George S. Hastings
ATTORNEY

Patented May 23, 1939

2,159,128

UNITED STATES PATENT OFFICE 2,159,128

MOISTENER FOR CIGAR SHAPERS

William J. Brophy, Linden, N. J., assignor to International Cigar Machinery Company, a corporation of New Jersey Application March 18, 1937, Serial No. 131,597

16 Claims. (Cl. 131—9)

This invention relates to cigar machines, and more particularly to moistening devices for cigar bunch concentrators and shapers having molds in which bunches are concentrated or shaped.

In the operation of cigar machines of this type it frequently happens that pressure exerted upon bunches being concentrated or shaped causes gummy substances to issue from the bunches. These substances tend to collect upon the surfaces of the molds, especially at the head and tuck end portions thereof, and unless some provision is made for their elimination they will harden, be difficult to remove, cause bunches to adhere to the molds, and thereby damage the bunches by breakage and splitting of their heads as they are ejected from the molds. In some instances trimming scraps, tobacco dust and similar materials may find their way into the molds, collect and also have a deleterious effect upon the bunches by causing an unevenness in the molds, and a sticky condition similar to that mentioned above.

According to this invention a moistening device is provided for moving into position for moistening either one or both ends of the molds as they are brought into proper position. The application of moisture to the mold ends apparently has at least a twofold purpose in that it tends to dissolve any gummy substances present and keep them from hardening on the molds. It also supplies a lubricant so that bunches coming into contact with the moistened surfaces of mold ends are prevented from adhering thereto, and may be ejected therefrom without damage to their ends.

It is, therefore, an object of this invention to provide means for contacting the ends of molds to moisten them prior to the introduction of bunches thereinto, so that substances which have a tendency to cause bunches to adhere to the molds have no effect, and bunches may be removed from the molds at all times in substantially perfect condition.

Another object is to insure the smooth operation of the related mechanism by maintaining the molds in clean condition, free from all unwanted materials which might gather therein.

An added feature of the invention is to moisten the surfaces of either or both ends of the molds before bunches are placed therein by bringing into contact therewith mechanism which will achieve this purpose whereby the molds present to bunches a surface to which they will not adhere.

A further object is to provide mechanism which will tend to clean the ends of cigar bunch molds by contact therewith prior to the introduction of bunches therein.

An additional object consists in providing mechanism for moistening and cleaning either or both ends of bunch molds prior to placing bunches in said molds.

With these and other objects not specifically mentioned in view, the invention consists in certain constructions and combinations which will be hereinafter fully described, and then specifically set forth in the claims hereunto appended.

In the accompanying drawing which forms a part of this specification, and in which like characters of reference indicate the same or like parts:

Figure 1:
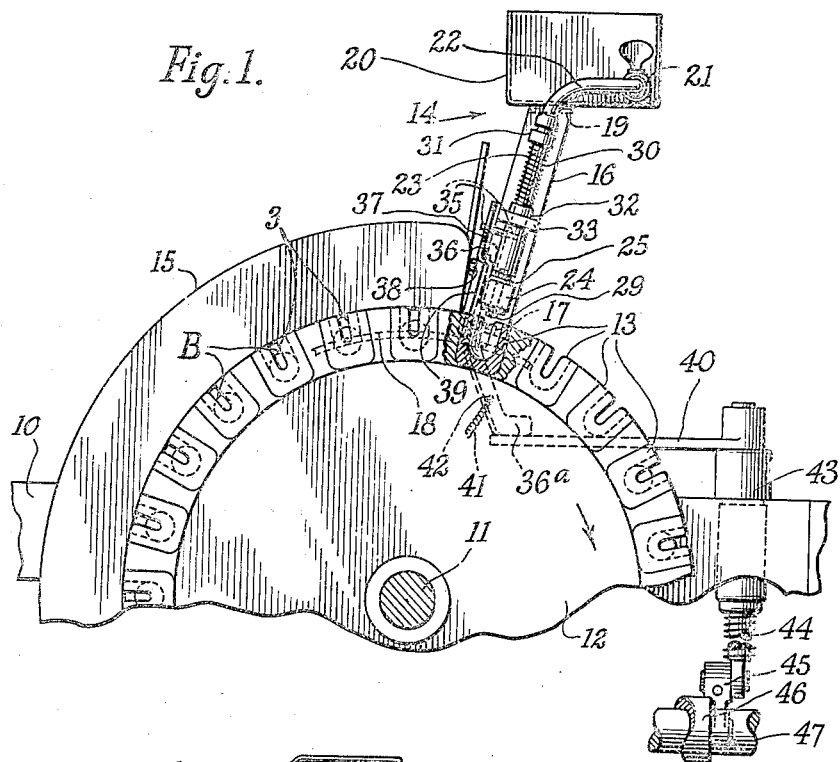
Fig. 1 is a side view of a moistening device in position for operation on a cigar machine and constructed in accordance with my invention.
Figure 2:
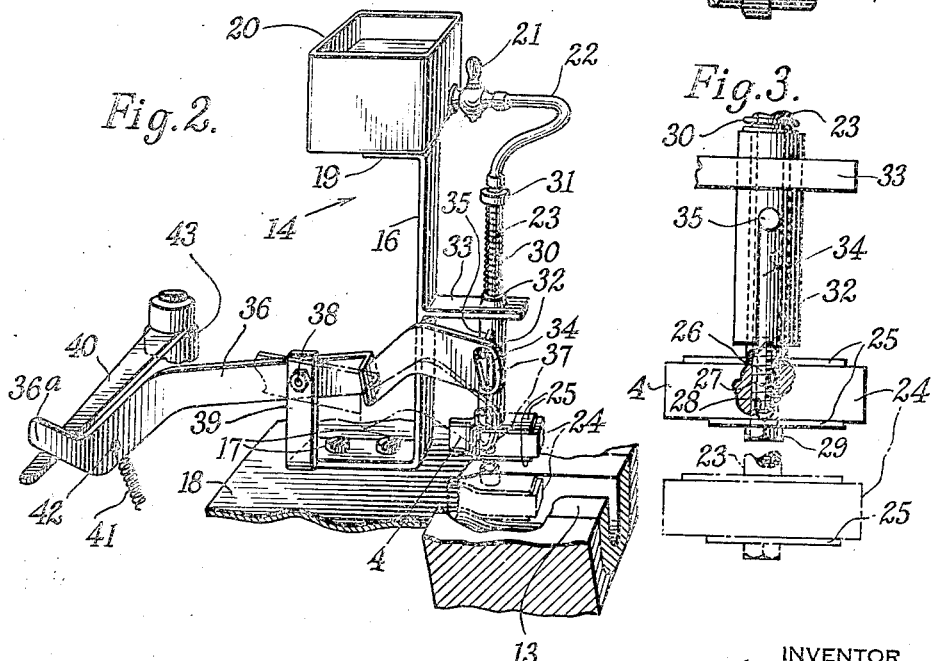
Fig. 2 is a perspective view of the structure shown in Fig. 1 with an operated position of the moistening device indicated in dot and dash lines.
Figure 3:
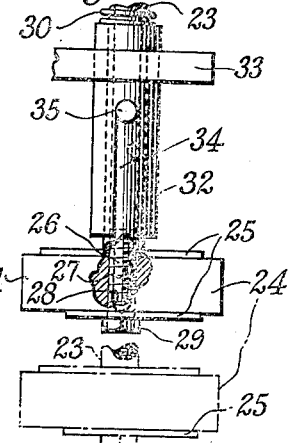
Fig. 3 is an enlarged view of the plunger and mold shaped felt moistening pad with an additional position indicated in dot and dash lines.

Referring to Fig. 1 a frame 10 of a cigar machine supports a shaft 11 of a turret bunch shaping mechanism comprising a turret 12 provided with a plurality of peripherally located shaper molds 13 for bunches B, which turret is indexed to bring the molds successively beneath the moistening device. This device denoted generally 14 is provided for operation with the molds 13 at either or both ends, and is located at the end of a shield 15 which covers a number of the molds and over any one of the molds which is in open or bunch-receiving position. The device 14 includes a frame bracket 16 secured at 17 to the turret casing 18 and supports a tank 20. In the embodiment shown the tank is of the gravity type and is suitably fixed to a bent end of bracket 16. A moistening fluid, such as water placed in the tank 20 is regulated by a valve 21 to enter a hose connection 22 and pass down through tubing 23, joined thereto to a point where the fluid is absorbed by an absorbent pad 24 of felt or like material formed to correspond in size and shape with molds 13 and having a projecting tail end 4 which enters the slotted end portion 3 of the mold. These slotted end portions of the molds are provided to afford clearance for a tip at the end of each cigar bunch which is eventually cut from the bunch after the molding operation has been completed. These slots tend to collect extraneous, undesirable substances by reason of the constricted space, and are therefore particularly liable to become foul, so that they require careful cleaning, which is provided for by the present invention. The material forming pad 25 is preferably secured to the tubing 23 between plates 25 by any suitable means, such as a threaded stud 26 suitably provided with ports 27 and 28 (Fig. 3) which allow the water to diffuse through the pad, and on which stud is screwed a nut 29. The tubing 23 (Figs. 2 and 3) is yieldingly held in a position which elevates the pad 24 by a coil spring 30 held between its collar 31 affixed to tubing 23 and a projecting end of a supporting guide sleeve 32 suitably attached to an extension 33 of the bracket 16. The guide sleeve 32 is longitudinally slotted for a part of its length across its diameter as at 34 to receive a pin 35 passed through the tubing 23 which coacts with a lever 36 (Fig. 3), slotted as at 37 and fulcrumed at 38 to a member which in the illustrated embodiment is an upturned leg 39 of the bracket 16. The other end of the lever 36a, designed to raise and lower the pad into and out of operative position in the molds is yieldingly held in engagement with an arm 40 by a spring 41 secured thereto at 42 from the frame 10. It will be seen that when the arm 40 is vertically operated at its location on the frame 10, at 43 by a plunger 44, through connections 45 and 46 (Fig. 1) to a cam lever shaft 47 of the cigar machine, the lever 36 will rock to lower the tubing 23 in its sleeve 32 to bring the felt pad 24 into engagement with the shaper mold 13 then in position beneath it. In this manner the pad will both clean each mold by a swabbing or brushing action and also adequately moisten its surface before the mold moves to the next station to receive a cigar bunch. In this manner each individual mold will also be presented to the swabbing action of the felt pad and moistened before arrival at the open or bunch receiving position and will be substantially free from any dirt, scrap, dust and sticky material.

The various means referred to may be varied in construction within the scope of the claims, for the particular device selected to illustrate the invention is but one of many possible concrete embodiments of the same. The invention is not, therefore, to be restricted to the precise details of the structure shown and described.

What is claimed is:

1. In a cigar machine, a bunch shaper having a plurality of bunch molds, and means movable into contact with said molds for applying moisture to a portion of the surface thereof.

2. In a cigar machine, the combination with a shaper provided with a plurality of spaced bunch molds, of a device for moistening said molds, said device including means for moving it into and out of contact with said molds.

3. The combination with a bunch shaper having a plurality of spaced mold pockets, of a moistening device for applying moisture to said pockets, said device comprising a pad shaped to conform with the shape of said pockets and constructed and arranged to apply moisture by direct contact with the walls of said mold pockets, and means for moving said pad into contact with said pockets.

4. In a cigar machine, the combination with a traveling carrier provided with spaced molds for cigar bunches to be shaped, of mechanism for moistening and cleaning said molds, said mechanism including a movable absorbent member, means for furnishing said member with moistening fluid, and means for moving said member into and out of contact with the surface of said molds.

5. In a device for moistening and cleaning the ends of molds of a cigar bunch shaping mechanism, an absorbent member shaped to conform to the configuration of the ends of said molds, means for supplying moistening fluid to said member, and means for moving said member into and out of moistening and cleaning contact with said molds.

6. The combination with a traveling carrier provided with a plurality of spaced bunch molds having ends provided with slots, of a moistening member shaped to fit said ends, and provided with an extension movable into said slots, means for moving said member into and out of said molds, and means for supplying moisture to said member.

7. In a cigar machine, a rotary drum provided with a plurality of peripherally spaced cigar bunch molds, a device for moistening an end of said molds, said device comprising an absorbent member shaped to conform with the shape of said mold end, means for moving said member into and out of contact with successive molds, and means for supplying moistening fluid to said member.

8. In a cigar machine, a traveling carrier provided with a plurality of spaced molds, a shaped member conforming in shape to an end of each of said molds, means for applying moisture to said member, and means for moving said member into contact with said molds to clean the surface thereof and apply moisture thereto.

9. In a cigar machine, a drum provided with a plurality of spaced molds, a moistening and cleaning member located adjacent said drum, means for moving said member into successive molds, for cleaning and moistening the surface thereof, and means for applying moisture to said member.

10. In a moistening and cleaning device for a cigar machine, a traveling carrier provided with a plurality of mold cavities, a resiliently mounted member shaped to fit the ends of said molds located adjacent said carrier for movement into and out of said cavities, means for supplying a moistening fluid to said member, and means for moving said member to and from mold cleaning and moistening position.

11. In a cigar machine, a carrier provided with a plurality of molds having slotted ends, a cleaning member comprising a pad shaped to conform to an end of said molds, and having a projecting extension to fit into said slots, and means for moving said member into and out of contact with said molds.

12. As a new article of manufacture, an attachment for a cigar machine of the type including a carrier having a plurality of mold cavities, said attachment comprising a combined moistening device and means for cleaning the ends of said cavities individually, including a pad shaped to fit at least one end of each of said cavities individually, means adapted to hold said pad normally in elevated position away from said carrier, a support, and means for moving said pad into said cavities successively to clean the same, said pad and said means for moving the pad being combined in a unitary self-contained portable structure with said support.

13. In a cigar machine, a carrier having a plurality of peripherally spaced bunch molds, and a cleaning and moistening device for said molds located adjacent said carrier, said device comprising a support, a member slidably mounted in said support, a pad carried by said member and contacting said molds to clean the same and apply moisture thereto, a moistening fluid supply tank mounted on said support, means for conducting the fluid from said tank to said moistening device, and means for moving said pad to and from operative position in said molds.

14. An attachment for a cigar machine of the type provided with molding mechanism having a cavity, said attachment including a support, a slide member movably mounted in said support, and a cleaning pad mounted upon said slide for movement into and out of said cavity in the mold, said attachment being further provided with yielding means normally holding said pad away from said mold, and with means for moving said pad into cleaning position in said mold.

15. In a cigar bunch mold moistening device, a movable carrier provided with a plurality of molds movable past said device, said device comprising a support positioned adjacent said carrier, a reciprocatory element mounted in said support, a moistening pad fixed to an end of said element, a moistening fluid supply tank, means connecting said tank and pad for supplying fluid to the latter, and means for moving said pad into and out of said molds.

16. In a cigar bunch mold moistening device, a movable member provided with a plurality of molds movable past said device, said device comprising a support positioned adjacent said member, a hollow reciprocatory element mounted in said support, a moistening pad fixed to an end of said element, a moistening fluid supply tank, means connecting said tank and hollow element for supplying moistening fluid to said pad, and means for moving said pad into and out of said molds.

WILLIAM J. BROPHY.